April 15, 1969  S. B. HARTOP  3,438,552
DEVICE FOR FILLING ELECTRIC BATTERIES WITH ELECTROLYTE
Filed Oct. 18, 1966
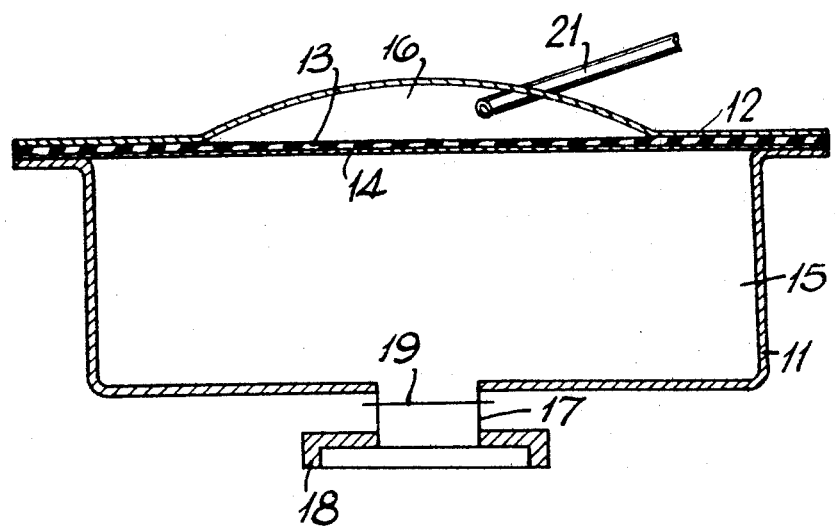

United States Patent Office 3,438,552
Patented Apr. 15, 1969

3,438,552
DEVICE FOR FILLING ELECTRIC BATTERIES WITH ELECTROLYTE
Stephen Ben Hartop, Maxstoke, near Coleshill, England, assignor to Joseph Lucas (Industries) Limited, Birmingham, England
Filed Oct. 18, 1966, Ser. No. 587,566
Claims priority, application Great Britain, Oct. 27, 1965, 45,596/65
Int. Cl. B67d 5/42; B65d 47/10
U.S. Cl. 222—386.5                    1 Claim This invention relates to a device for filling electric batteries, particularly alkaline batteries, with electrolyte.

A device according to the invention comprises a housing having an outlet adapted for connection to a manifold forming part of a battery to be filled, a diaphragm dividing the housing into a main chamber which contains the electrolyte, and a second chamber adapted for connection to a source of pressure, a first bursting disc between the main chamber and the outlet, and a second bursting disc protecting the diaphragm from the electrolyte, the arrangement being such that pressure applied to the second chamber causes both bursting discs to burst so that the electrolyte is forced into the battery by the diaphragm.

The accompanying drawing is a sectional side view illustrating one example of the invention.

Referring to the drawing, there is provided a housing constituted by a container 11 closed by a lid 12 which is centrally dished. Trapped between the container and lid are a rubber diaphragm 13 and a stainless steel bursting disc 14 which are in facial contact and divide the housing into a main chamber 15 and a second chamber 16 within the dished portion of the lid 12. The chamber 15 contains the electrolyte, and includes an outlet 17 adapted for connection to the manifold 18 of an alkaline battery, the electrolyte normally being prevented from reaching the outlet by a gold bursting disc 19. The disc 14 protests the diaphragm 13 from the action of the electrolyte.

Extending into the chamber 16 is a pipe 21 through which gas pressure can be applied to the chamber 16 when it is desired to fill the battery. Such pressure acts through the diaphragm 13 to burst the disc 14, whereafter the diaphragm expands and applies pressure through the electrolyte to burst the disc 19, so that the diaphragm further expands and the electrolyte is then forced into the battery.

If desired, a protective cap may be placed over the outlet 17 to prevent the outlet from being blocked by the diaphragm 13. The cap must of course permit electrolyte to flow through it to the outlet.

Having thus described my invention what I claim as new and desire to secure by Letters Patent is:

1. A device for filling electric batteries with electrolyte, comprising a housing having an outlet adapted for connection to a manifold forming a part of a battery to be filled, a resilient diaphragm dividing the housing into a main chamber which contains the electrolyte, and a second chamber adapted for connection to a source of pressure, a first bursting disc between the main chamber and the outlet, and a second bursting disc facially contacting and protecting the diaphragm from the electrolyte, the arrangement being such that pressure applied to the second chamber causes both bursting discs to burst so that the electrolyte is forced into the battery by the expension of the diaphragm.

References Cited

UNITED STATES PATENTS

| 2,530,633 | 11/1950 | Scholz | 222—541 |
| 2,557,120 | 6/1951 | Knoblock | 222—541 |
| 3,079,047 | 2/1963 | Chiodini et al. | 222—541 |

SAMUEL F. COLEMAN, *Primary Examiner.*

H. S. LANE, *Assistant Examiner.*

U.S. Cl. X.R.
222—541